US005126712A

United States Patent [19]

Sugiyama

[11] Patent Number: 5,126,712

[45] Date of Patent: Jun. 30, 1992

[54] WATER COVER ARRNGEMENT FOR A SOLENOID APPARATUS

[75] Inventor: Takeshi Sugiyama, Himeji, Japan

[73] Assignee: Mitsubishi Denki Kabushiki Kaisha, Tokyo, Japan

[21] Appl. No.: 523,964

[22] Filed: May 15, 1990

[30] Foreign Application Priority Data

May 17, 1989 [JP] Japan ........................ 1-123342

[51] Int. Cl.[5] ........................ A01F 7/00

[52] U.S. Cl. ........................ 335/278; 277/212 FB; 74/18.2

[58] Field of Search ........................ 335/202, 278; 277/212 FB; 74/18, 18.1, 18.2

[56] References Cited

U.S. PATENT DOCUMENTS 4,720,639 1/1988 Sakayanagi et al. .............. 290/38 R
4,916,423 4/1990 Sugiyama .............. 335/278

FOREIGN PATENT DOCUMENTS 38106 3/1977 Japan .
129757 10/1981 Japan .
291770 12/1986 Japan .

*Primary Examiner*—George Harris

*Attorney, Agent, or Firm*—Sughrue, Mion, Zinn, Macpeak and Seas

[57] ABSTRACT

A solenoid apparatus comprising a solenoid case (27) having an open end and a substantially closed end, a plunger (30) electromagnetically movably mounted in the solenoid case, and a substantially cup-shaped flexible water-tight boot (40). The cup-shaped boot (40) surrounds an end portion of the plunger (30) projecting from the solenoid case (27) and connected to the open end of the solenoid case, the flexible boot (40) having a bottom wall central portion intimately secured to the end portion of the plunger (30). The flexible boot (40) comprises a vent hole (44) defined by a hollow tube (45) extending through the boot wall in parallel to the plunger and a flexible valve plate (48) formed integral with and inside of the boot wall and biased by the elasticity of the material of the boot (40) into an open position (FIG. 5). The valve plate (48) is adapted to be pushed against the vent hole tube (45) by the plunger (30) to close the vent hole (44) when the plunger (30) is not operated, and the valve plate (48) is separated by its elasticity from the hollow tube (45) by the elasticity to allow air communication through the vent hole (44) when the plunger (30) is operated.

2 Claims, 4 Drawing Sheets

WATER COVER ARRNGEMENT FOR A SOLENOID APPARATUS

BACKGROUND OF THE INVENTION

This invention relates to a solenoid device applicable to a solenoid switch for an engine starter and, more particularly, to a water cover arrangement particularly suitable for use in a solenoid switch of an vehicular engine starter.

FIG. 1 is a front view illustrating, partially in section, an engine starter to which a conventional electromagnetic attraction device or a solenoid apparatus is mounted. In FIG. 1, the engine starter comprises a front bracket 1, a motor yoke 2, a rear bracket 3 and a solenoid switch 4 mounted to the front bracket 1.

The solenoid switch 4 has a plunger 7 which is movably disposed within an inner passage 6 in the switch case 5 and which is adapted to be electromagnetically attracted by an excitation coil 8. Also, a hook 9 is disposed inside of the plunger 7 and connected to the plunger 7 through a spring 10 and its front end engages with a lever 11. Further, a boot 12 made of rubber is secured at its outer circumference portion to the switch case 5 and secured at its inner circumference portion to a support member 13 placed over the front end portion of the plunger 7 for axially slidably supporting the hook 9. The boot 12 is provided with a vent hole 12*a* formed in the boot 12 for communicating therethrough the inside and the outside of the boot 12.

The solenoid switch 4 of the above structure is provided with the boot 12 for the water proof and the dust proof of the sliding portions of the plunger 7, thereby to prevent the sliding motion from becoming awkward due to the generation of rust or the like. However, when the end face of the plunger 7 is completely covered by the boot 12, a pressure difference is generated between the inside and the outside of the boot 12, causing an undue deformation in the boot 12 which may result in breaking of the boot 12, so that the vent hole 12*a* is provided in the boot 12 in order to eliminate the generation of the pressure difference.

The conventional solenoid switch 4 is constructed as above described, and since the boot 12 has the vent hole 12*a* which is always open, water can enter into the solenoid switch 4 through the vent hole 12*a* when a large amount of water flies onto the solenoid switch 4. That is, at the occasion of the vehicle running through a pool of water, a large amount of water càn enter into the interior of the starter through an opening 1*a* of the front bracket 1, the water then enters into the interior of the solenoid switch 4 through the vent hole 12*a* of the boot 12, disadvantageously causing problems of improper operation such as the improper sliding operation of the plunger 7.

Also, while an arrangement as disclosed in Japanese Utility Model Laid-Open No. 60-113940 is proposed, in which an end face of a plunger is covered by a boot and a central portion of the plunger not covered by the boot and a central portion of the plunger not covered by the boot is provided with a through hole for communicating the inside and the outside of the boot, this arrangement also has the same problems as the above-described conventional solenoid switch 4 because the through hole is always kept open.

SUMMARY OF THE INVENTION

Accordingly, one object of the present invention is to provide a solenoid apparatus having a water cover arrangement in which the above-discussed problems of the conventional design are eliminated.

Another object of the present invention is to provide a solenoid apparatus having a water-proof flexible boot which prevents the generation of an undesirable pressure difference between the inside and the outside of the boot.

Another object of the present invention is to provide a solenoid apparatus with a water-proof flexible boot which is reliable even when a large amount of water flies on the apparatus.

The solenoid apparatus of the present invention comprises a solenoid case having an open end and a substantially closed end, a plunger electromagnetically movably mounted in the solenoid case, and a substantially cup-shaped flexible water-tight boot. The cup-shaped boot surrounds an end portion of the plunger projecting from the solenoid case and connected to the open end of the solenoid case, the flexible boot having a bottom wall central portion intimately secured to the end portion of the plunger. The flexible boot comprises a vent hole defined by a hollow tube extending through the boot wall in parallel to the plunger and a flexible valve plate formed integral with and inside of the boot wall and biased by the elastisity of the material of the boot into an open position. The valve plate is adapted to be pushed by the plunger against the vent hole to close it when the plunger is not operated, and the valve plate is separated from the inner end of the hollow tube defining the vent hole to allow communication through the vent hole when the plunger is operated.

According to the present invention, since the boot is in the closing position when the plunger is inoperated ,and is in the open position when the plunger is operated, the pressure difference between the inside and the outside of the boot generated cannot be generated even when the plunger is in the actuated position, and the ingress of water into the interior when the plunger is inoperated is reliably prevented by the boot in the closing position.

BRIEF DESCRIPTION OF THE DRAWINGS

The present invention will become more readily apparent from the following detailed description of the preferred embodiment of the present invention taken in conjunction with the accompanying drawings, in which.

DESCRIPTION OF THE PREFERRED EMBODIMENT

Figure 2:
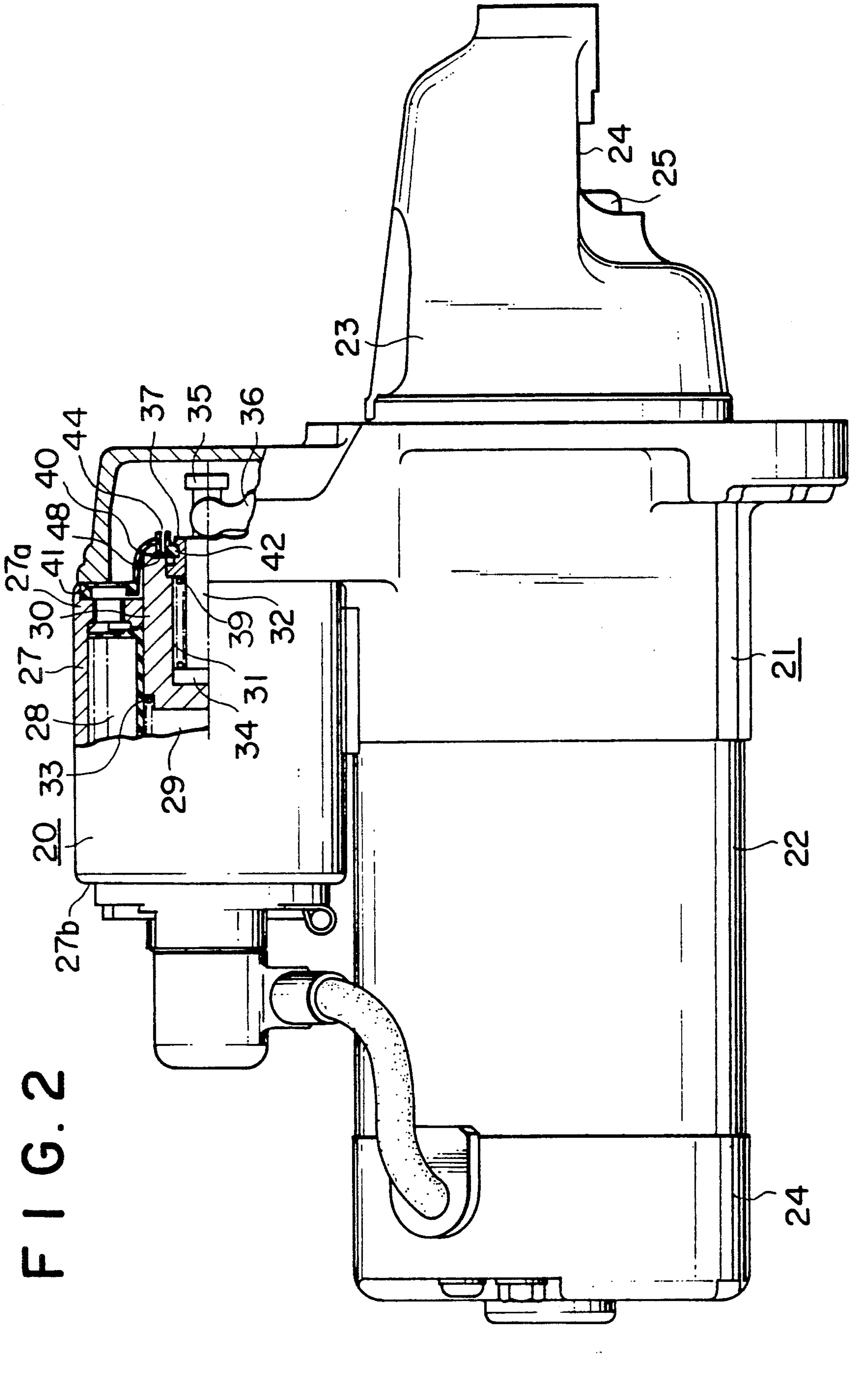
FIG. 2 is a front view in section of the main portion of the starter to which the solenoid apparatus of one embodiment of the present invention is applied.

FIG. 2 illustrates one embodiment of the solenoid apparatus with a flexible water cover arrangement of the present invention as being applied as a solenoid switch of an engine starter.

The solenoid switch 20 of this embodiment is mounted to an engine starter 21 which comprises a starter motor 22 having a front bracket 23 and a rear bracket 24. The front bracket 23 has an opening 24 through which a pinion gear 25 for driving an engine ring gear (not shown) is exposed.

Figure 1:
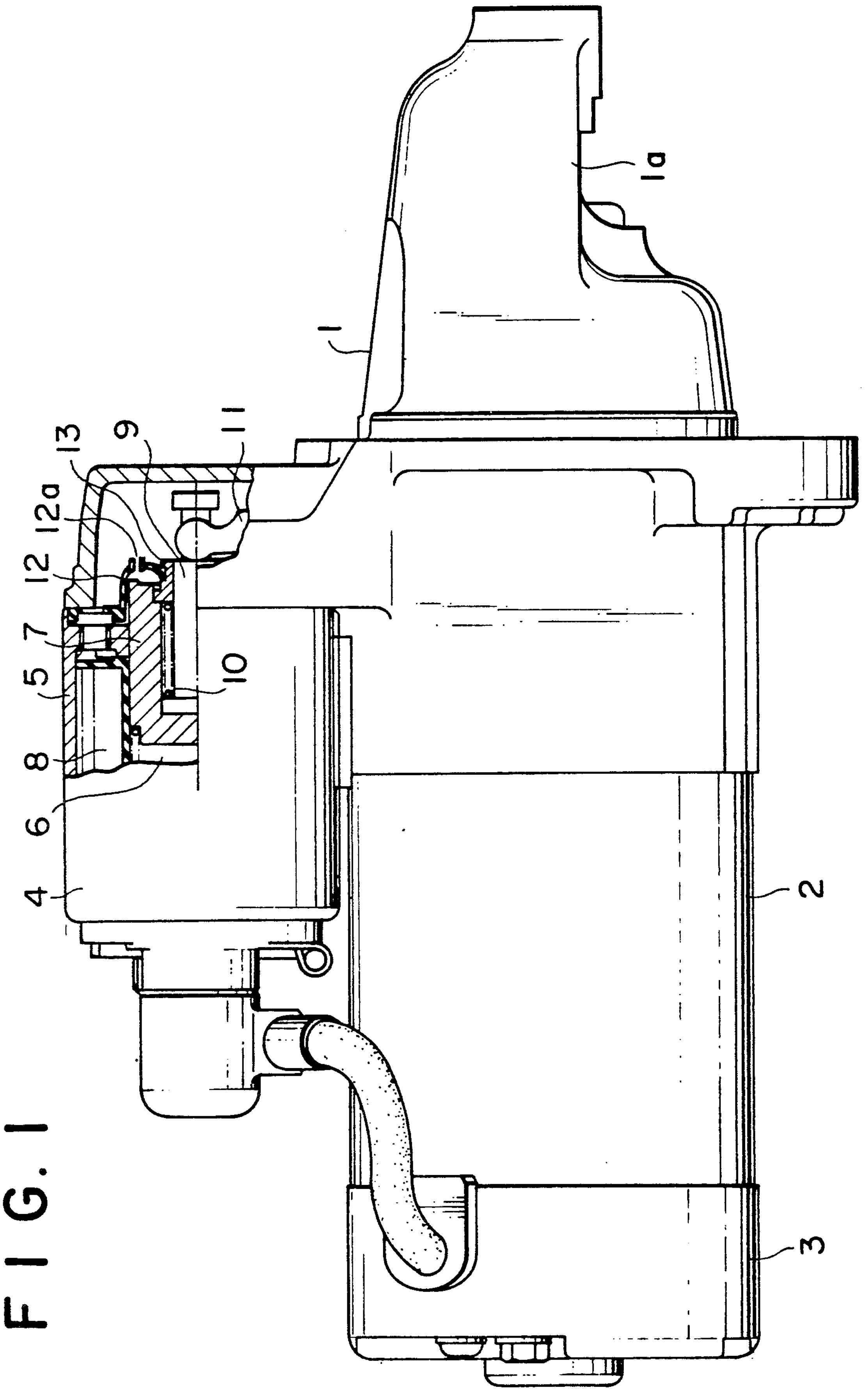
FIG. 1 is a front view in section of the main portion of the starter showing the conventional solenoid apparatus.
Figure 4:
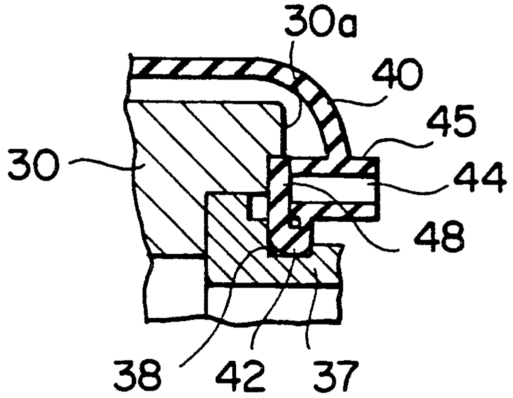
FIG. 4 is a sectional view of the main portion of the solenoid apparatus illustrated in FIG. 2.

The solenoid switch 20 comprises a substantially cup-shaped switch case 27 having an open end 27*a* and a closed end 27*b*, an excitation coil 28 disposed within the switch case 27 and having a central passage 29, a plunger 30 axially movably disposed within the axial central passage 29 of the solenoid coil 28 and having a central bore 31, and an axially extending hook member 32 slidably disposed within the central bore 31 of the plunger 30. A compression spring 33 is disposed between the switch case 27 and the plunger 30 so that the plunger 30 is always biased toward a projected position illustrated in FIG. 2. The hook member 32 has a flange 34 at the rear end (left end as viewed in FIG. 2) thereof inserted into the central bore 31 of the plunger 30 and has a hook 35 at the front end (right end as viewed in FIG. 1) thereof. The hook 35 engages a shift lever 36 connected to a slidable mechanism of the engine starter 21 for shifting the pinion 25 into engagement with the engine ring gear (not shown). The hook member 32 is axially slidably supported within the central bore 31 by a ring-shaped support member 37 attached to the front end of the plunger 30 around the central bore 31 as best illustrated in FIG. 4. The support member 37 has a circumferential groove 38 in its outer circumference for the purpose which will be described later. It is seen that a compression spring 39 is disposed between the flange 34 of the hook member 32 and the support member 37 so that the hook member 32 is always urged against the bottom of the central bore 31 of the plunger 30.

The solenoid switch 20 also comprises a substantially cup-shaped flexible water-tight boot 40 having an open end and a closed end with an opening formed in the closed end. The boot 40 surrounds and covers the front end portion of the plunger 30 projecting between the switch case 27 and the support member 37 together with an annular clearance defined around the outer circumferential surface of the plunger 30. The open end of the boot 40 has a water-tight seal portion 41 which is an annular packing-like seal structure securely attached to the switch case 27. The opening at the closed end of the cup-shaped boot 40 has a water-tight seal 42 arranged to fit into the circumferential groove 38 of the support member 37.

Figure 3:
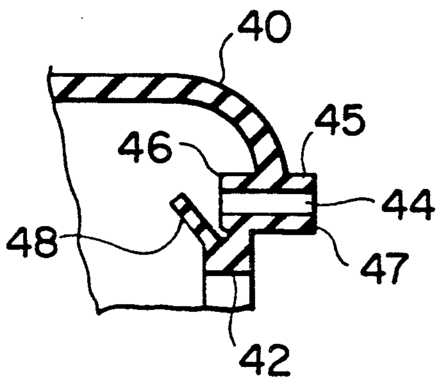
FIG. 3 is a sectional view of the main portion of the boot of the solenoid apparatus illustrated in FIG. 2.

The flexible boot 40 comprises in its radial wall portion a vent hole 44 defined by a hollow tube 45 extending therethrough substantially in parallel to the plunger 30 and having an inner end 46 and an outer end 47. The boot 40 also comprises a substantially tongue-shaped flexible valve plate. 48 disposed inside of the boot 40 and biased by the elasticity of the material of the boot 40 in a separated position illustrated in FIG. 3 in which the valve plate 48 is separated from the inner end 46 of the hollow tube 45 defining the vent hole 44. Both the tube 45 and the valve plate 48 are integral with the boot 40 and formed of a molded elastic material such as rubber. As best shown in FIG. 3, the valve plate 48 extends at about 45° from the annular seal portion 42 before the boot 40 is assembled. The valve plate 48 is arranged at a position in which it is pushed by the front end face of the plunger 30 against the inner end 46 of the tube 45 to close it when the plunger 30 is not operated and in the position illustrated in FIG. 2. When the plunger 30 is operated as illustrated in FIG. 5, the front end face of the plunger 30 allows the valve plate 48 to elastically return to its home position similar to that illustrated in FIG. 3 relative to the vent hole tube 45, so that the vent hole tube 45 and the valve plate 48 are separated from each other to allow communication between the interior and the exterior of the boot 40 through the vent hole 44.

In the non-operated position of the solenoid switch 21, in which the plunger 30 is projected from the switch case 27 due to the spring action of the compression spring 33, the flexible boot 40 is generally in its natural configuration as molded and extends between the switch case 27 and the plunger 30. However, since the plunger 30 is in the projected position in which the front end of the plunger 30*a* is brought close to the boot 40, the valve plate 48 is pushed and deformed by the front end of the plunger 30*a* to be pressed against the inner end 46 of the vent hole tube 45 to water-tightly close the vent hole 44 as illustrated in FIG. 4. Thus, when the solenoid switch 21 is not operated, the ingress of water, dust and the like into the sliding movement portion of the plunger 30 is reliably prevented by the boot 40 in the closed position.

Figure 5:
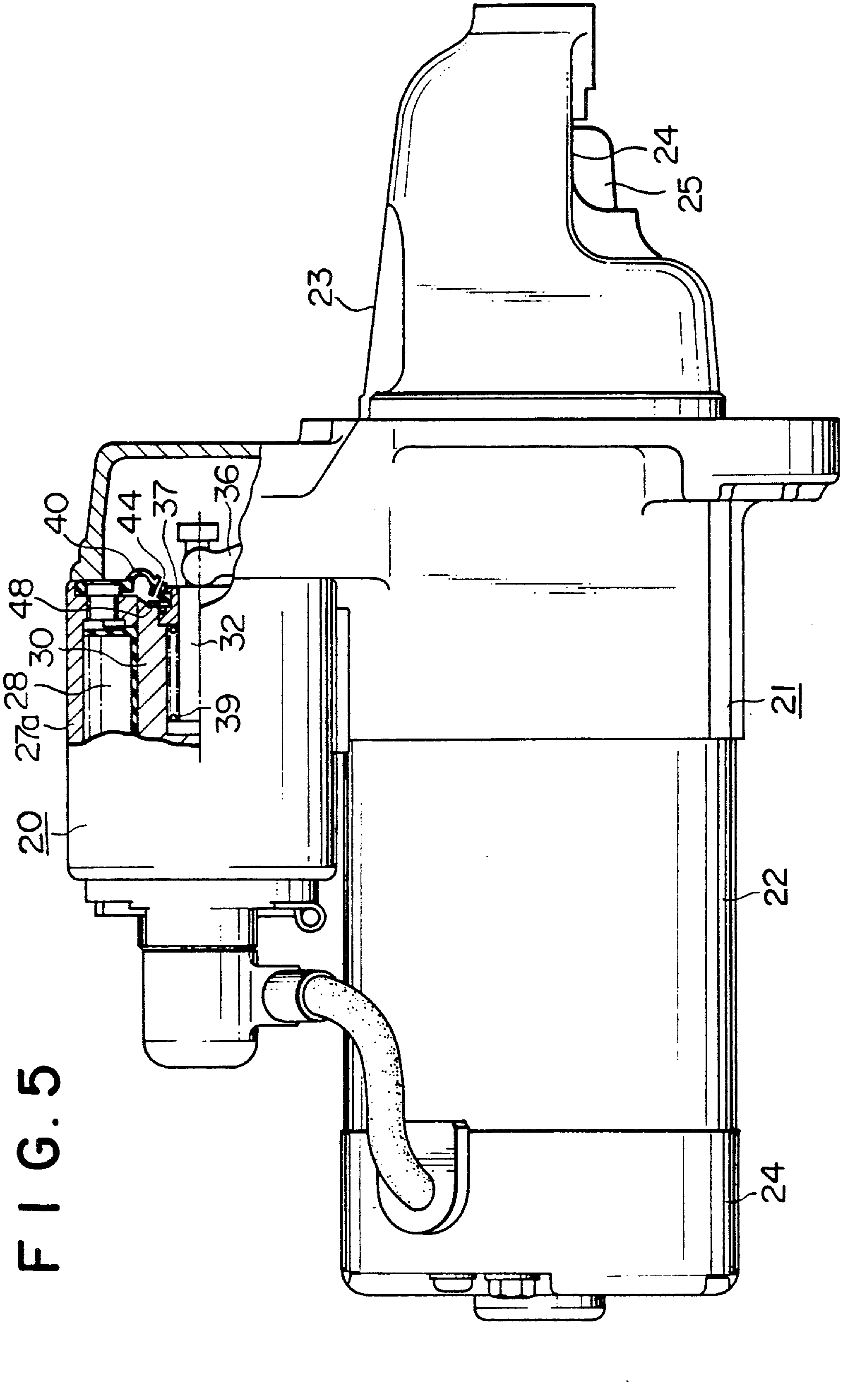
FIG. 5 is a front view in section of the main portion of the starter illustrating the state in which the solenoid apparatus illustrated in FIG. 2 is operated.

When the solenoid switch 21 is operated as illustrated in FIG. 5 where the plunger 30 is moved in the attracted position in which the plunger 30 together with the support member 37 to which the boot 40 is attached is retracted into the switch case 27, the inner circumferential portion of the boot 40 is pulled toward its open end to deform the flexible boot 40 as illustrated in FIG. 5. This causes the inner end 46 of the vent hole tube 45 to separate from the valve plate 48, thereby communicating the interior and the exterior of the boot 40 through the now opened vent hole 44 in the tube 45. Therefore, the pressure difference cannot be generated upon the movement of the plunger 30.

While the vent hole 44 is open when the solenoid switch 21 is being operated, the ingress of water into the solenoid switch 21 can take place virtually only when a vehicular starter is not operated. That is, when a large amount of water-ingress into the starter is observed when the vehicle is driven through a pool of water and (1) where the water splash from the tires or the like fall on the starter, and (2) where a large amount of water enters within the engine transmission case and the water is sprayed into the interior of the starter by the engine ring gear through the opening 24 of the front bracket 23 which are all conditions in which the starter is not usually operated. Therefore, the ingress of water into the solenoid switch 21 can sufficiently be prevented by the water proof structure during the non-operated condition of the switch.

While a solenoid switch for an engine starter is described as an embodiment of the present invention, the present invention is not limited thereto but is equally effective in another electromagnetic device, particularly an electromagnetic device in which there is a fear of the ingress of water during the non-operated condition.

As has been described, according to the water-proof cover structure of the present invention, the cup-shaped boot surrounds an end portion of the plunger projecting from the solenoid case and connected to the open end of the solenoid case, the flexible boot having a bottom wall central portion intimately secured to the end portion of the plunger. The flexible boot comprises a vent hole defined by a hollow tube extending through the boot wall in parallel to the plunger and a flexible valve plate formed integral with and inside of the boot wall and biased by the elastisity of the material of the boot into an open position. The valve plate is adapted to be pushed by the plunger, when the plunger is not operated, against the vent hole to close it, and the valve plate is separated from the inner end of the hollow tube defining the vent hole, when the plunger is operated, to allow communication through the vent hole. Therefore, the pressure difference between the inside and the outside of the boot cannot be generated upon the movement of the plunger, and the ingress of water into the interior of the starter switch is prevented, whereby a highly reliable solenoid device can be obtained. Also, since the vent hole is closed by the flange portion pressed by the plunger, the closure of the vent hole is ensured and the plunger end face needs not be flat and smooth, providing an advantage that the arrangement is applicable irrespective of the configuration of the plunger.

What is claimed is:

1. A solenoid apparatus comprising:

a solenoid case having an open end and a substantially closed end;

a solenoid coil mounted within said solenoid case;

a plunger electromagnetically movably mounted in said solenoid case, and a substantially cup-shaped flexible water-tight boot surrounding an end portion of said plunger projecting from said solenoid case and connected to said open end of said solenoid case, said flexible boot having a bottom wall central portion intimately secured to the end portion of said plunger;

said flexible boot comprising a vent hole extending therethrough and a flexible valve plate formed integral with said wall, said valve plate being adapted to be pushed by said plunger, when said plunger is not operated, against said vent hole to close it, said vent hole and said valve plate being separated from each other, when said plunger is operated, to allow communication through said vent hole.

2. A solenoid apparatus as claimed in claim 1, wherein said vent hole is defined by a hollow tube extending through said wall substantially in parallel to said plunger and having an inner end and an outer end, said valve plate being disposed inside of said boot and biased by the elasticity of the material of said boot in a separated position in which said valve plate is separated from said inner end of said hollow tube defining said vent hole.

* * * * *